(12) United States Patent
Miyashita (10) Patent No.: US 10,850,331 B2
(45) Date of Patent: Dec. 1, 2020

(54) CUTTING TOOL AND METHOD FOR MACHINING ANNULAR GROOVE

(71) Applicant: MITSUBISHI HITACHI POWER SYSTEMS, LTD., Yokohama (JP)

(72) Inventor: Satoshi Miyashita, Kanagawa (JP)

(73) Assignee: MITSUBISHI HITACHI POWER SYSTEMS, LTD., Yokohama (JP)

(*) Notice: Subject to any disclaimer, the term of this patent is extended or adjusted under 35 U.S.C. 154(b) by 12 days.

(21) Appl. No.: 16/090,379

(22) PCT Filed: Jan. 12, 2017

(86) PCT No.: PCT/JP2017/000721
§ 371 (c)(1),
(2) Date: Oct. 1, 2018

(87) PCT Pub. No.: WO2017/175438
PCT Pub. Date: Oct. 12, 2017

(65) Prior Publication Data
US 2019/0111493 A1 Apr. 18, 2019

(30) Foreign Application Priority Data
Apr. 4, 2016 (JP) .................................. 2016-075038

(51) Int. Cl.
*B23B 27/04* (2006.01)
*B23B 29/04* (2006.01)
(Continued)

(52) U.S. Cl.
CPC .............. *B23B 27/04* (2013.01); *B23B 27/08* (2013.01); *B23B 29/00* (2013.01); *B23B 29/043* (2013.01); *B23B 2220/12* (2013.01)

(58) Field of Classification Search
CPC ....... B23B 27/086; B23B 27/04; B23B 27/08; B23B 27/045; B23B 27/1625;
(Continued)

(56) References Cited

U.S. PATENT DOCUMENTS 3,505,715 A * 4/1970 Germani ............. B23B 27/1685
407/108
4,898,054 A * 2/1990 Bystrom ............... B23B 29/043
407/102

(Continued)

FOREIGN PATENT DOCUMENTS

| JP | 2006-130608 A | 5/2006 | |
| JP | 6035696 B1 * | 11/2016 | ............. B23B 27/04 |
| WO | WO-2015108042 A1 * | 7/2015 | ........... B23B 27/086 |

OTHER PUBLICATIONS

International Search Report dated Apr. 11, 2017, issued in counterpart International Application No. PCT/JP2017/000721 (2 pages).

*Primary Examiner* — Nicole N Ramos
(74) *Attorney, Agent, or Firm* — Westerman, Hattori, Daniels & Adrian, LLP (57) ABSTRACT

A cutting tool includes a cutting chip and a chip holder. The chip holder includes: a body part having a height dimension larger than a width dimension, the body part including a first attachment face that intersects with a cutting feed direction, and a second attachment face that intersects with the first attachment face; a chip support part whose base end portion is connected to the body part and in which the cutting chip is attached to the upper end portion in the height direction of a tip end portion of the chip support part such that the cutting chip projects to one side in the width direction of the chip support part; a reinforcement part provided along the height direction of the chip support part; and a chip receiving part that supports the cutting chip projecting from the chip support part.

5 Claims, 8 Drawing Sheets (51) Int. Cl.
*B23B 27/08* (2006.01)
*B23B 29/00* (2006.01)

(58) Field of Classification Search
CPC .............. B23B 29/043; B23B 2220/12; B23B 220/126; B23B 2205/02; B23B 2205/13; B23B 2200/201
See application file for complete search history.

(56) References Cited

U.S. PATENT DOCUMENTS

| | | | | |
|---|---|---|---|---|
| 5,079,979 | A * | 1/1992 | Pano | B23B 29/043 407/110 |
| 6,250,854 | B1 * | 6/2001 | Pano | B23B 27/04 407/110 |
| 2006/0257217 | A1 * | 11/2006 | Berminge | B23B 27/04 407/117 |
| 2010/0135736 | A1 * | 6/2010 | Hecht | B23B 27/04 407/86 |
| 2016/0193661 | A1 * | 7/2016 | Kurokawa | B23B 27/086 407/66 |
| 2017/0151612 | A1 * | 6/2017 | Hecht | B23B 27/04 |
| 2017/0173701 | A1 * | 6/2017 | Hecht | B23B 27/002 |

* cited by examiner

CUTTING TOOL AND METHOD FOR MACHINING ANNULAR GROOVE

FIELD

The present invention relates, in a rotary machine such as a steam turbine or a gas turbine, to a cutting tool for forming an annular groove of a rotor to which a turbine blade is attached, and a method for machining the annular groove with the cutting tool.

BACKGROUND

A general steam turbine is constituted such that a rotor is rotatably supported in a chamber, a plurality of turbine blades are fixed to the rotor in a multi-stage manner, a plurality of turbine vanes are fixed to a blade ring supported on the chamber in a multi-stage manner, and the multi-stage turbine blades and the multi-stage turbine vanes are alternately arranged next to each other. Accordingly, when steam is brought into an inner cylinder, the steam is supplied to the multi-stage turbine vanes and the multi-stage rotor blades, so that the rotor rotates via the multi-stage turbine blades, and a power generator connected with the rotor is driven.

In the steam turbine, each of the turbine blades has a base end portion fitted in and fixed to an annular groove provided in the outer periphery of the rotor. The annular groove may be formed in a T-shape. In this case, the base end portion of the turbine blade, which is a fitting portion of the turbine blade, is formed in a T-shape, inserted into the annular groove formed in a T-shape by being slid into the annular groove, and fitted in the annular groove.

When the annular groove having T-shape is formed in the outer periphery of the rotor, the annular groove having T-shape has a small opening width on the outer periphery side of the rotor, and a large opening width on the center side of the rotor. Hence, a special cutting tool is required for machining the annular groove. As such a cutting tool, for example, there has been known a cutting tool described in the following Patent Literature 1. The cutting tool described in the following Patent Literature 1 has a tip located on the tip end portion of a shank, and in order to cut a T-shaped groove, the tip has a ridge located along the longitudinal direction of the shank.

CITATION LIST

Patent Literature

Patent Literature 1: Japanese Patent Application Laid-open No. 2006-130608

SUMMARY

Technical Problem

The above-mentioned annular groove of the rotor, which is formed in a T-shape, has the small opening width on the outer periphery side of the rotor, and the large opening width on the center side of the rotor. Hence, the cutting tool has the shank that is small in width at a part thereof to which the cutting chip is attached. In this case, the rigidity of the shank is lowered, and when the annular groove in the outer periphery of the rotor is machined with the use of the cutting tool, the cutting chip vibrates. Hence, it is difficult to perform the highly accurate cutting of the annular groove.

The present invention has been made to solve the above-described problems, and it is an object of the present invention to provide a cutting tool and a method for machining an annular groove that are capable of suppressing the vibration of the cutting chip when machining the annular groove to improve machining accuracy of the annular groove.

Solution to Problem

To achieve the above-described object, a cutting tool of the present invention includes a cutting chip, and a chip holder that holds the cutting chip. The chip holder includes: a body part having a height dimension larger than a width dimension, the body part having a first attachment face that intersects with a cutting feed direction, and a second attachment face that intersects with the first attachment face; a chip support part whose base end portion is connected to the body part and in which the cutting chip is attached to the upper end portion in the height direction of the tip end portion of the chip support part such that the cutting chip projects to one side in the width direction of the chip support part; a reinforcement part provided along the height direction of the chip support part; and a chip receiving part that supports the cutting chip projecting from the chip support part.

Consequently, the body part of the chip holder that holds the cutting chip is attached to a machine tool via a first attachment face and a second attachment face, thus attaching the body part to the machine tool with high precision, and the height dimension of the body part is larger than the width dimension of the body part, thus improving the rigidity of the body part, and suppressing the deformation of the body part due to the stress that acts on the body part in machining. Furthermore, in the chip holder, the chip support part is reinforced by the reinforcement part, thus improving the torsional rigidity of the chip holder, and suppressing the deformation of the chip holder due to the stress that acts on the chip holder in machining. In addition, the cutting chip is stably supported by the chip receiving part, thus suppressing the deformation of the cutting chip due to the stress that acts on the cutting chip in machining. As a result, the vibration of the cutting chip when machining the annular groove is suppressed, thus improving the machining accuracy of the annular groove.

In the cutting tool of the present invention, the reinforcement part is formed in a curved shape such that a cutting chip side of the reinforcement part is recessed.

Consequently, the reinforcement part is formed in a curved shape, thus preventing the interference of the reinforcement part with the rotary body to be machined, and the sufficient thickness of the reinforcement part is ensured to suppress the torsion of the chip support part in machining, thus improving the machining accuracy of the annular groove.

The cutting tool according to the present invention has a third attachment face arranged parallel to the first attachment face at the portion projecting from the body part of the reinforcement part, and a cutout portion is formed in the intersection of the third attachment face and the second attachment face.

Consequently, the cutout portion is formed in the intersection of the third attachment face and the second attachment face and hence, two attachment faces are properly brought into contact with the attachment face of the machine tool, thus improving the mounting accuracy of the chip holder.

In the cutting tool of the present invention, the chip receiving part is formed in a tapered shape tapering in a direction away from the cutting chip, and includes a flank formed on an upstream in the cutting feed direction of the cutting chip.

Consequently, the chip receiving part is formed in a tapered shape, thus receiving properly the stress of the cutting chip, and supporting stably the cutting chip. Furthermore, the flank is formed in the cutting chip on the upstream in the cutting feed direction, thus preventing the interference of the cutting chip with the rotary body to be machined.

In the cutting tool of the present invention, the cutting chip is fixed to the upper end portion of the chip support part with a fixing pin, and right-and-left sides of the cutting chip are respectively supported by right-and-left guide surfaces provided in the chip support part.

Consequently, the cutting chip is fixed with the fixing pin, and supported by the right-and-left guide surfaces and hence, the three point support of the cutting chip is achieved, thus supporting stably the cutting chip.

Furthermore, according to a method for machining the annular groove of the present invention, the annular groove is machined in the outer periphery of the rotary body to be rotated. The method includes: forming a first annular groove being constant in width; forming a second annular groove on one side in the rotation axis direction of the rotary body and on the rotation axis side of the rotary body in the first annular groove; and forming a third annular groove to be continuously extended to the second annular groove on the one side in the rotation axis direction of the rotary body and on the outer periphery side of the rotary body in the first annular groove.

Consequently, the second annular grooves and the third annular grooves are formed in the first annular groove so as to form the annular groove, and the vibration of the cutting chip when machining the annular groove is suppressed, thus improving the machining accuracy of the annular groove.

In the method for machining the annular groove of the present invention, the second annular groove and the third annular groove are formed in the one side of the rotation axis direction of the rotary body in the first annular groove and thereafter, the second annular groove and the third annular groove are also formed in other side of the rotation axis direction of the rotary body in the first annular groove.

Consequently, it is possible to form easily the annular groove having a T-shape in cross section with high precision in a short time.

Advantageous Effects of Invention

According to the cutting tool and the method for machining the annular groove of the present invention, the chip holder includes the body part, the chip support part, the reinforcement part, and the chip receiving part; and the second annular grooves and the third annular grooves are formed in the first annular groove to form the annular groove. Hence, the vibration of the cutting chip when machining the annular groove is suppressed, thus improving the machining accuracy of the annular groove.

BRIEF DESCRIPTION OF DRAWINGS

FIG. 7-1 is a schematic view illustrating a method for machining an annular groove according to the embodiment.

FIG. 7-2 is a schematic view illustrating the method for machining the annular groove according to the embodiment.

FIG. 7-3 is a schematic view illustrating the method for machining the annular groove according to the embodiment.

FIG. 7-4 is a schematic view illustrating the method for machining the annular groove according to the embodiment.

DESCRIPTION OF EMBODIMENTS

Hereinafter, with reference to attached drawings, the explanation is specifically made with respect to a preferred embodiment of a cutting tool and a method for machining an annular groove according to the present invention. Here, the present invention is not limited to the embodiment, and when a plurality of embodiments are conceivable, the constitution of the embodiments combined with each other is included in the present invention.

Figure 1:
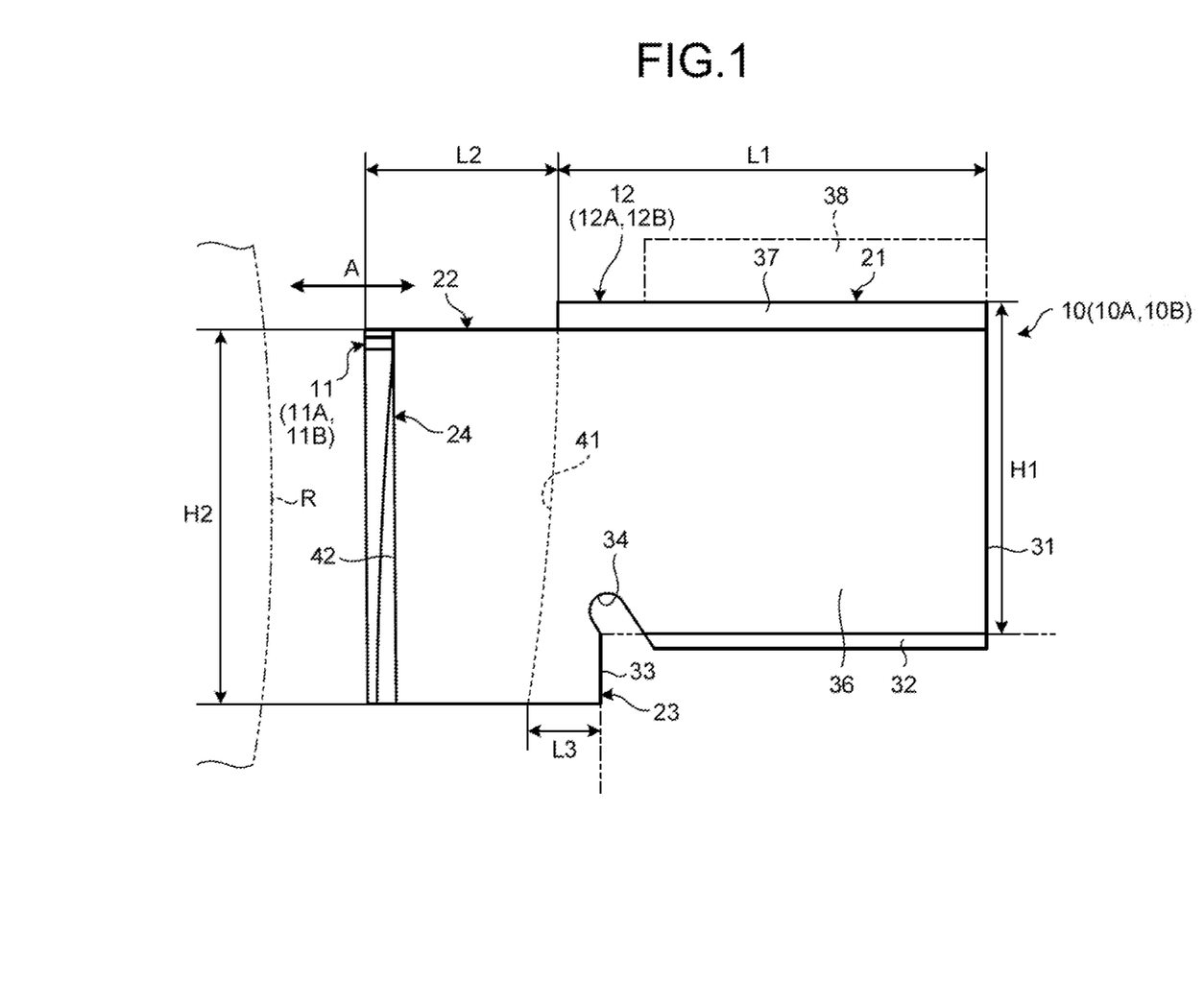
FIG. 1 is a side view illustrating a cutting tool according to the embodiment.
Figure 2:
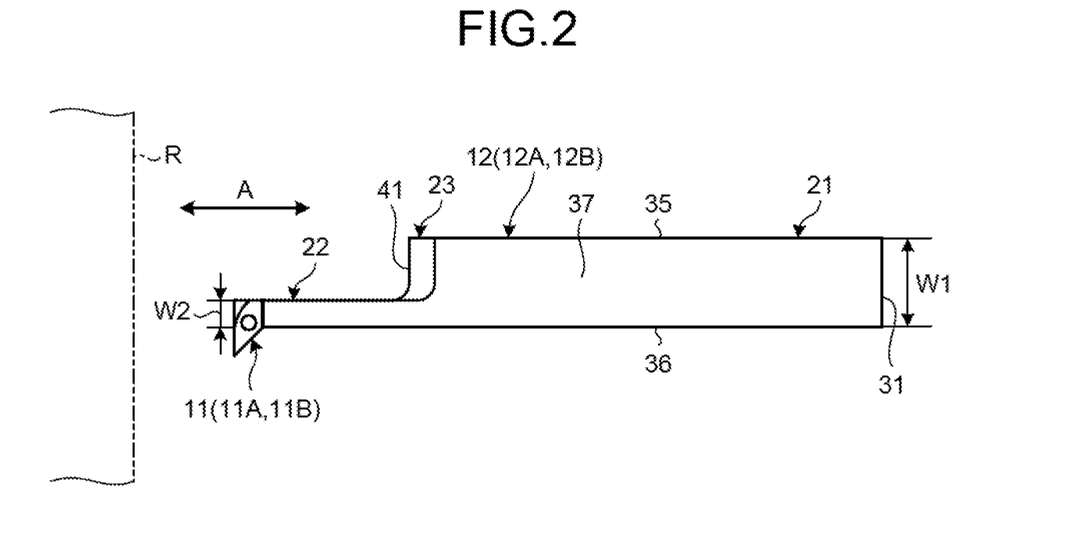
FIG. 2 is a plan view illustrating the cutting tool.
Figure 3:
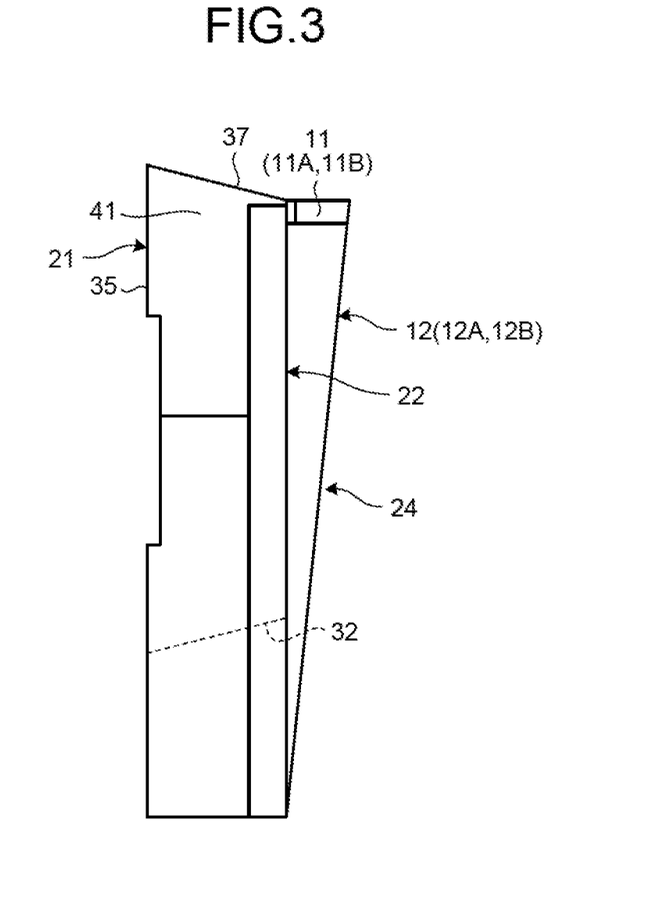
FIG. 3 is a front view illustrating the cutting tool.
Figure 4:
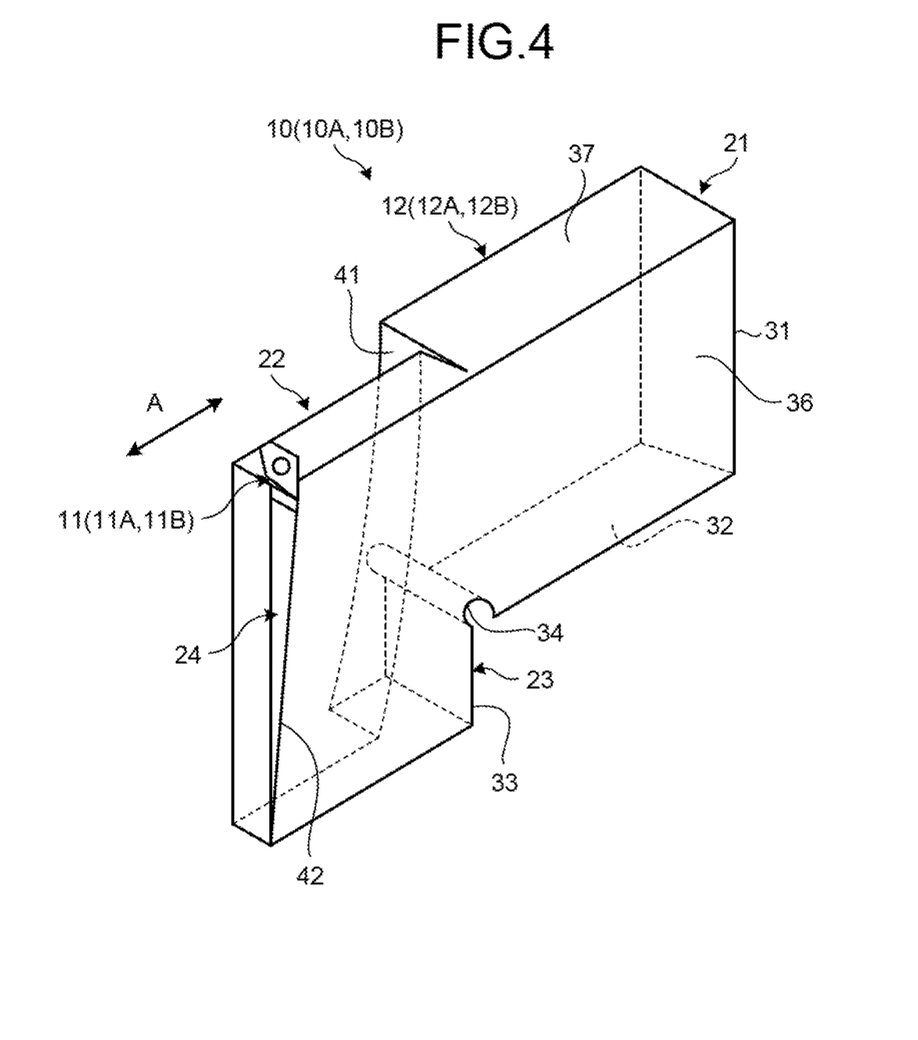
FIG. 4 is a perspective schematic view illustrating the cutting tool.

FIG. 1 is a side view illustrating a cutting tool according to the embodiment, FIG. 2 is a plan view illustrating the cutting tool, FIG. 3 is a front view illustrating the cutting tool, and FIG. 4 is a perspective schematic view illustrating the cutting tool.

In a steam turbine, a rotor is constituted such that a plurality of turbine blades are fixed to the rotor in a multi-stage manner, and base end portions of the respective turbine blades are fitted in and fixed to an annular groove of which is formed in a T-shape in cross section, the annular groove being formed in the outer periphery of the rotor. The cutting tool according to the embodiment is used for machining the annular groove of the rotor that is to be formed in a T-shape in cross section.

As illustrated in FIG. 1 to FIG. 4, a cutting tool 10 is attached to a machine tool (not illustrated in the drawings), used for machining an annular groove G (see FIG. 7-4) to be formed in a T-shape in cross section in the outer periphery of a rotor (rotary body) R, and includes a cutting chip 11, and a chip holder 12 that holds the cutting chip 11. In the embodiment, as the cutting tool 10, a cutting tool 10A used for machining the rotor R on the rotation axis side in the annular groove G, and a cutting tool 10B used for machining the rotor R on the outer periphery side in the annular groove G are provided. Accordingly, two types of cutting chips 11A and 11B are used as the cutting chip 11, and two types of chip holders 12A and 12B are used as the chip holder 12.

First of all, the cutting tool 10A is explained. The cutting tool 10A includes the cutting chip 11A and the chip holder 12A. The chip holder 12A includes a body part 21, a chip support part 22, a reinforcement part 23, and a chip receiving part 24.

The body part 21 is formed in a rectangular block shape and is set to have the width W1, the height H1, and the length L1. The dimension of the height H1 is set larger than the dimension of the width W1. The body part 21 includes a first attachment face 31 that intersects with (orthogonal to) a cutting feed direction A of the machine tool, and a second attachment face 32 that intersects with (orthogonal to) the first attachment face 31. The first attachment face 31 is formed on the rear part of the body part 21, and the second attachment face 32 is formed on the lower part of the body part 21. Accordingly, when the cutting tool 10A is attached to the machine tool, the position of the chip holder 12 in the cutting feed direction A is determined by the first attachment face 31, and the position of the chip holder 12 in the height direction (perpendicular direction) is determined by the second attachment face 32.

Furthermore, there is provided a third attachment face 33 that intersects with (orthogonal to) the cutting feed direction A of the machine tool as an auxiliary attachment face. The third attachment face 33 is formed on the chip support part-22 side of the body part 21, and arranged parallel with the first attachment face 31. Accordingly, when the cutting tool 10A is attached to the machine tool, if the position of the chip holder 12 in the cutting feed direction A is determined by the first attachment face 31, a minute gap is formed between the machine tool and the third attachment face 33. To enhance the fixing rigidity of the chip holder 12A, an adjustment-use shim plate (not illustrated in the drawings) is inserted into the minute gap between the machine tool and the third attachment face 33, thereby eliminating the minute gap. In this case, the third attachment face 33 may be adopted in place of the first attachment face 31 so that the position of the chip holder 12A can be determined by the second attachment face 32 and the third attachment face 33. Furthermore, a cutout portion 34 is provided in the intersection of the second attachment face 32 and the third attachment face 33. In addition, to enhance the fixing rigidity of the chip holder 12A, for example, each of the attachment faces 31, 32, and 33 may pressed to be brought into close contact with the machine tool by using screws or the like.

Furthermore, the body part 21 includes a fourth attachment face 35 formed on one side thereof, and an attachment face 36 formed on the other side thereof. In addition, the body part 21 includes an attachment pressing face 37 formed on the upper side thereof, and the attachment pressing face 37 is inclined with respect to the second attachment face 32 and the horizontal direction that intersects with (orthogonal to) the cutting feed direction A. Accordingly, when the cutting tool 10A is attached to the machine tool, a fixture 38 presses the attachment pressing face 37 and the fourth attachment face 35 is pressed against the machine tool, so that the position of the chip holder 12 in the horizontal direction that intersects with the cutting feed direction A is determined.

The chip support part 22 is formed in a rectangular block shape and is set to have the width W2, the height H2, and the length L2. The dimension of the height H2 is set larger than the dimension of the width W2. The chip support part 22 is connected at the base end portion thereof to the body part 21. In practice, the body part 21 and the chip support part 22 are integrally formed with each other. The dimension of the width W2 of the chip support part 22 is set smaller than the dimension of the width W1 of the body part 21, the dimension of the height H2 of the chip support part 22 is set larger than the dimension of the height H1 of the body part 21, and the dimension of the length L2 of the chip support part 22 is set smaller than the dimension of the length L1 of the body part 21.

Furthermore, the cutting chip 11A is attached to the upper end portion in the height direction of the tip end portion of the chip support part 22 in such a manner that the cutting chip 11A projects to one side in the width direction of the chip support part 22. In this case, the upper end portion of the chip support part 22 is set substantially the same in height as the upper end portion of the body part 21 while the bottom end portion of the chip support part 22 projects downward from the bottom end portion of the body part 21, and the above-mentioned third attachment face 33 is formed on such vertical wall in the bottom end portion of the chip support part 22.

The reinforcement part 23 is arranged between the body part 21 and the chip support part 22 along the height direction in the chip support part 22. The reinforcement part 23 is formed in a curved shape in such a manner that the cutting chip-11 side of the reinforcement part 23 is recessed. That is, since the body part 21 and the chip support part 22 have the dimensions of the widths W1 and W2 different from each other, respectively, the body part 21 is formed in a continuous planar shape with no step on the attachment face-36 side thereof whereas a stepped portion 41 is formed on the attachment face-35 side of the body part 21. The upper end portion of the stepped portion 41 is located slightly closer to the cutting chip 11 than the third attachment face 33. Furthermore, the stepped portion 41 is formed in a concave shape in such a manner that the cutting chip-11A side thereof is curved from the upper end portion to the bottom end portion, thereby forming the reinforcement part 23 having a width identical with the width W1 of the body part 21 and a predetermined length L3 longer than the dimension of the upper end portion thereof, between the body part 21 and the chip support parts 22, and in the lower part of the chip support part 22.

The chip receiving part 24 supports the lower part of the cutting chip 11A that projects from the chip support part 22. The chip receiving part 24 is formed in a tapered shape tapering in the direction away from the cutting chip 11; that is, the chip receiving part 24 is formed in a tapered shape tapering downwardly in the height direction (in the rightward direction in FIG. 1). According to the embodiment, the chip receiving part 24 is formed in a triangular shape in horizontal cross section in accordance with the shape of the cutting chip 11, and a vertex of the triangular shape is displaced to the tip-end-portion side of the chip support part 22 along with the downward extension of the chip receiving part 24, thereby forming a flank 42 on the upstream in the cutting feed direction A.

Next, the cutting tool 10B is explained. The cutting tool 10B is includes the cutting chip 11B and the chip holder 12B. Here, the cutting tool 10B has the substantially same configuration as the cutting tool 10A, and its detailed explanation is omitted. Since the cutting tool 10A and the cutting tool 10B differ from each other in that the cutting tool 10A and the cutting tool 10B use the cutting chips 11A and 11B, respectively, and the constitutions of the respective fixing parts of the cutting chips 11A and 11B in the chip holders 12A and 12B are different from each other, their different points are explained.

Figure 5:
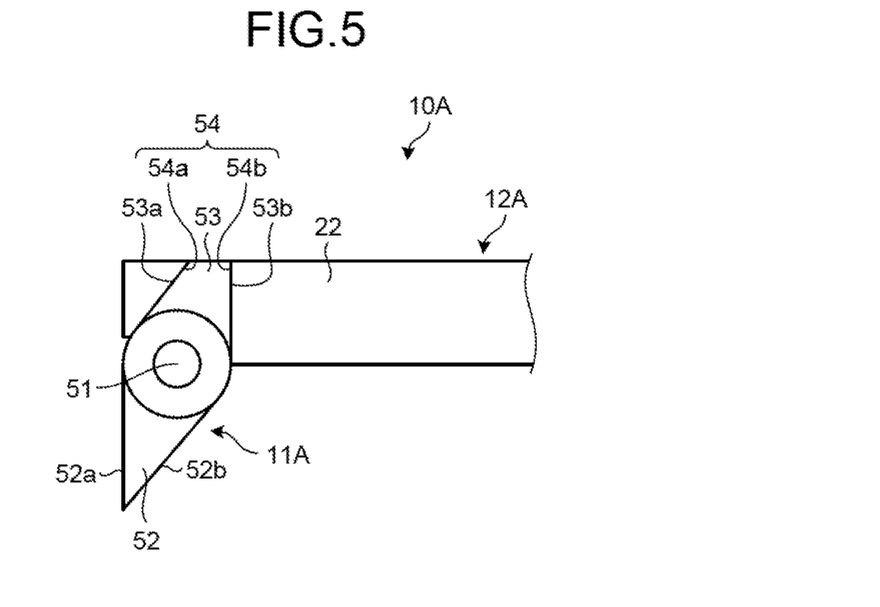
FIG. 5 is a plan view illustrating a fixing state of a cutting chip 11A in the cutting tool 10A.
Figure 6:
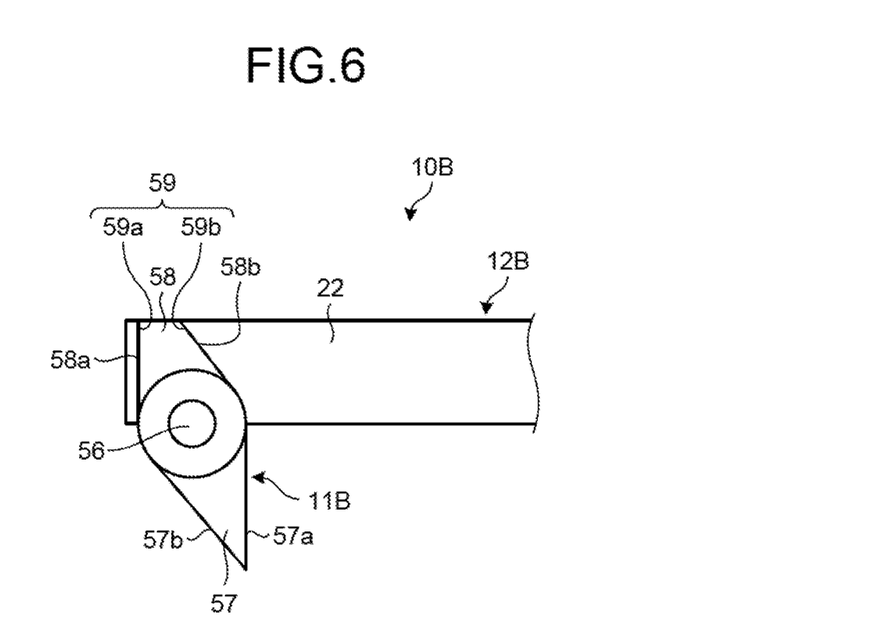
FIG. 6 is a plan view illustrating a fixing state of a cutting chip 11B in the cutting tool 10B.

FIG. 5 is a plan view illustrating a fixing state of the cutting chip 11A in the cutting tool 10A, and FIG. 6 is a plan view illustrating a fixing state of the cutting chip 11B in the cutting tool 10A.

As illustrated in FIG. 5, in the cutting tool 10A, the center portion of the cutting chip 11A is fixed to the tip-end upper end portion of the chip support part 22 in the chip holder 12A with a fixing pin 51. The cutting chip 11A has a chip 52 formed in a tapered shape whose tip end angle is 30°, and the chip 52 includes a cutting edge and a rake face that are located at the corner portion between surfaces 52a and 52b. Furthermore, the cutting chip 11A has a support part 53, and the support part 53 includes two support faces 53a and 53b. The chip support part 22 forms therein an attaching recess 54 in which the cutting chip 11A is fitted, and the attaching recess 54 includes right-and-left guide surfaces 54a and 54b that support the support faces 53a and 53b of the cutting chip 11A, respectively. In this case, the cutting chip 11A is a commercially available chip, only the chip 52 located on one side of the cutting chip 11A is used, and the tip end portion of a chip located on the other side of the cutting chip 11A is cut out to constitute the chip as the support part 53. Accordingly, it is possible to reduce the width of the tip end portion of the cutting tool 10A.

As illustrated in FIG. 6, in the cutting tool 10B, the center portion of the cutting chip 11B is fixed to the tip-end upper end portion of the chip support part 22 in the chip holder 12B with a fixing pin 56. The cutting chip 11B has a chip 57 formed in a tapered shape whose tip end angle is 30°, and the chip 57 includes a cutting edge and a rake face that are located at the corner portion between surfaces 57a and 57b. Furthermore, the cutting chip 11B has a support part 58, and the support part 58 includes two support faces 58a and 58b. The chip support part 22 forms therein an attaching recess 59 in which the cutting chip 11B is fitted, and the attaching recess 59 includes right-and-left guide surfaces 59a and 59b that support the support faces 58a and 58b of the cutting chip 11B, respectively. In this case, the cutting chip 11B is a commercially available chip, only the chip 57 located on one side of the cutting chip 11B is used, and the tip end portion of a chip located on the other side of the cutting chip 11B is cut out to constitute the chip as the support part 58. Accordingly, it is possible to reduce the width of the tip end portion of the cutting tool 10B.

Here, the explanation is made with respect to the method for machining the annular groove according to the embodiment where the annular groove is machined in the outer periphery of the rotor R with the cutting tool 10 mentioned above. FIG. 7-1 to FIG. 7-4 are schematic views each illustrating the method for machining the annular groove according to the embodiment.

As illustrated in FIG. 7-1 to FIG. 7-4, the method for machining the annular groove according to the embodiment includes forming a first annular groove G1 being constant in width; forming a second annular groove G2 on one side in the rotation axis direction of the rotor R and on the rotation axis side of the rotor R, in the first annular groove G1; and forming a third annular groove G3 to be continuously extended to the second annular groove G2 on the one side in the rotation axis direction of the rotor R and on the outer periphery side of the rotor R, in the first annular groove G1.

Furthermore, in the method for machining the annular groove according to the embodiment, the second annular groove G2 and the third annular groove G3 are formed on the one side of the rotation axis direction of the rotor R in the first annular groove G1 and thereafter, the second annular groove G2 and the third annular groove G3 are also formed on the other side in the rotation axis direction of the rotor R in the first annular groove G1.

Figure 71:
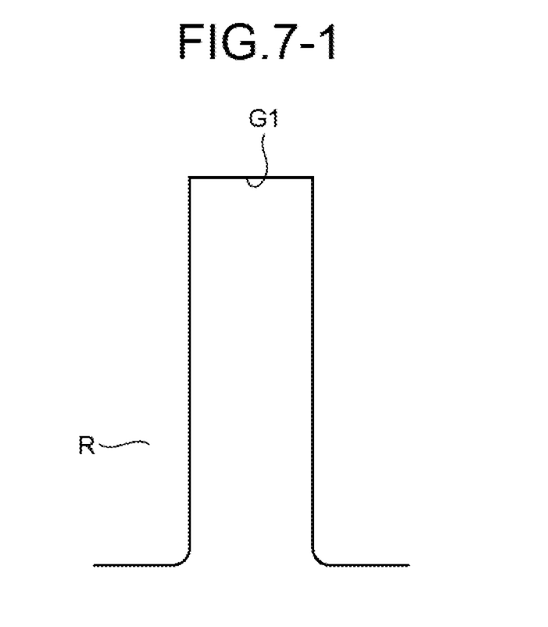
Figure 72:
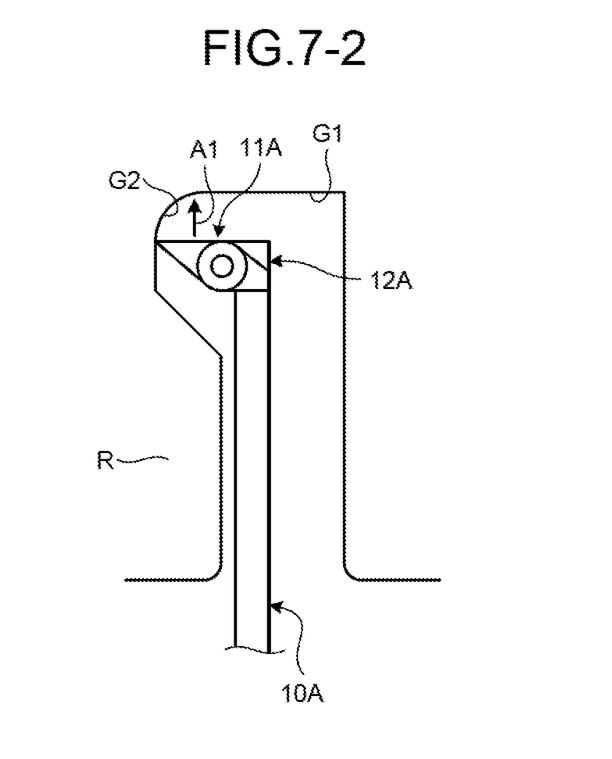

Specifically, first of all, as illustrated in FIG. 7-1, in a state that the rotor R is rotated, a cutting tool (not illustrated in the drawings) is frontwardly moved in the cutting feed direction A thus forming the first annular groove G1 being constant in width. Next, as illustrated in FIG. 7-2, using the cutting tool 10A, in a state that the rotor R is rotated, the cutting chip 11A is inserted into the inside of the first annular groove G1 via the chip support part 22 of the chip holder 12A. Furthermore, the cutting chip 11A is displaced to one side (the left side in FIG. 7-2) in the rotation axis direction of the rotor R in the first annular groove G1, and moved in a cutting feed direction A1, thus forming the second annular groove G2 to be continuously extended to the first annular groove G1 on the rotation axis side of the rotor R. In this case, the cutting chip 11A is moved in the cutting feed direction A1, and then moved in a direction reverse to the cutting feed direction A1 to set a predetermined cutting removal and thereafter, moved again in the cutting feed direction A1, thus forming the second annular groove G2. The machining process with the use of the cutting chip 11A is repeatedly performed, thus forming the second annular groove G2 in the wall surface of the first annular groove G1.

Figure 73:
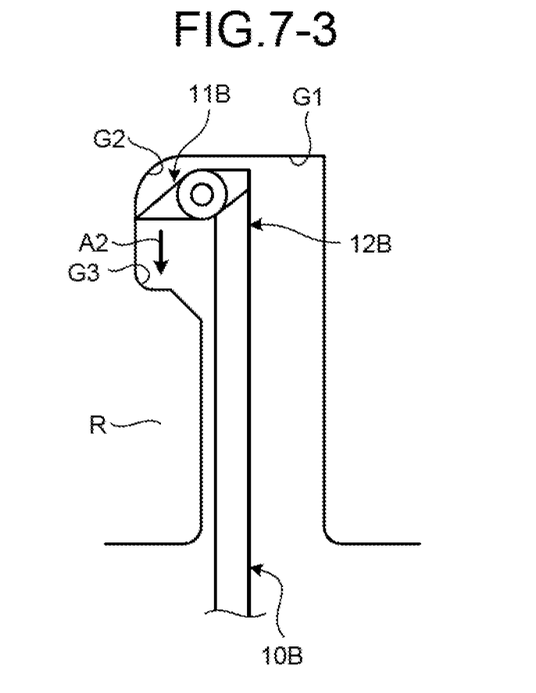

Subsequently, as illustrated in FIG. 7-3, using the cutting tool 10B, in a state that the rotor R is rotated, the cutting chip 11B is inserted into the inside of the first annular groove G1 via the chip support part 22 of the chip holder 12B. Furthermore, the cutting chip 11B is displaced to the one side (the left side in FIG. 7-3) in the rotation axis direction of the rotor R in the first annular groove G1, and moved in a cutting feed direction A2, thus forming the third annular groove G3 to be continuously extended to the first annular groove G1 and the second annular groove G2 on the outer periphery side of the rotor R. In this case, the cutting chip 11B is moved in the cutting feed direction A2, and then moved in a direction reverse to the cutting feed direction A2 to set a predetermined cutting removal and thereafter, moved again in the cutting feed direction A2, thus forming the third annular groove G3. The machining process with the use of the cutting chip 11B is repeatedly performed, thus forming the third annular groove G3 in the wall surface of the first annular groove G1.

Figure 74:
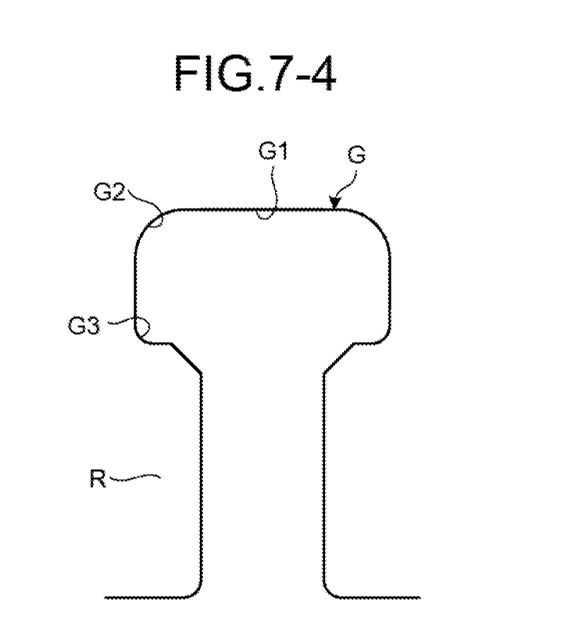

After the second annular groove G2 and the third annular groove G3 are formed in the one side of the first annular groove G1 by using the cutting tools 10A and 10B; in the same manner as above, as illustrated in FIG. 7-4, the second annular groove G2 and the third annular groove G3 are also formed on the other side of the first annular groove G1, thus forming the annular groove G having a T-shape in cross section. Here, two cutting tools (not illustrated in the drawings) having respective shapes in left-and-right symmetry corresponding to the cutting tools 10A and 10B are used to form the second annular groove and the third annular groove on the other side of the first annular groove G1.

Figure 8:
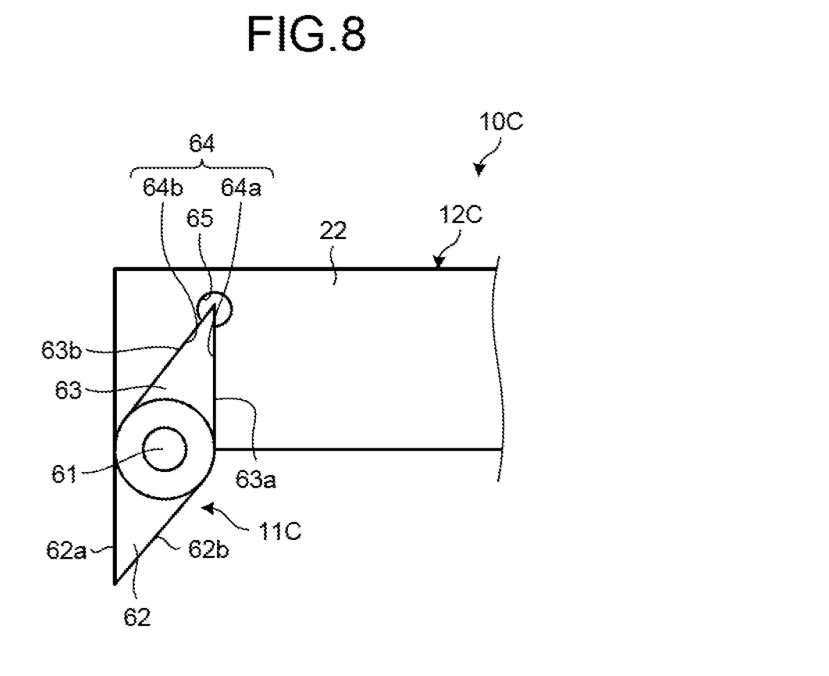
FIG. 8 is a plan view illustrating a fixing state of a cutting chip in a first modification of the cutting tool according to the embodiment.
Figure 9:
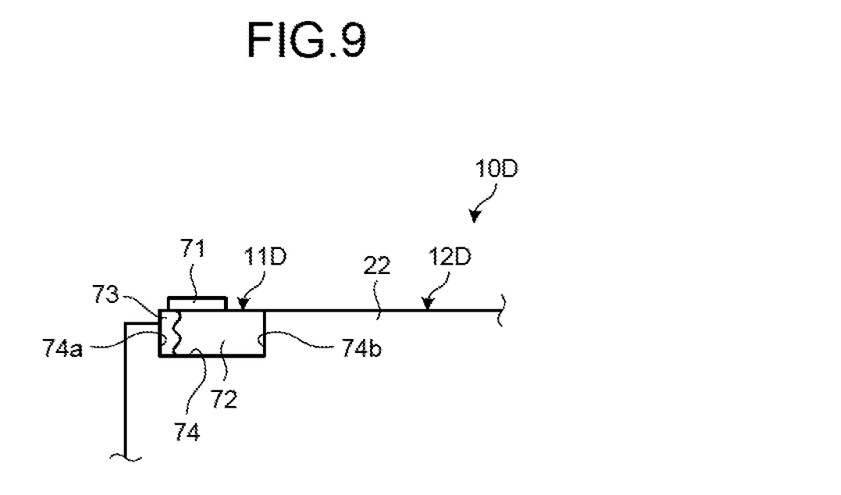
FIG. 9 is a side view illustrating a fixing state of a cutting chip in a second modification of the cutting tool according to the embodiment.

In the above-mentioned explanation, although the cutting tools 10A and 10B, two types of the cutting chips 11A and 11B, and two types of the chip holders 12A and 12B are used as the cutting tool 10, the cutting chip 11, and the chip holder 12, respectively, the present invention is not limited to this constitution. FIG. 8 is a plan view illustrating a fixing state of a cutting chip in a first modification of the cutting tool according to the embodiment, and FIG. 9 is a side view illustrating a fixing state of a cutting chip in a second modification of the cutting tool according to the embodiment.

In the first modification, a cutting tool 10C has a cutting chip 11C and a chip holder 12C, and the center portion of the cutting chip 11C is fixed to the tip-end upper end portion of the chip support part 22 in the chip holder 12C with a fixing pin 61. The cutting chip 11C has a chip 62 formed in a tapered shape whose tip end angle is 30°, and the chip 62 includes two cutting edges 62a and 62b, and a rake face located in one cutting edge 62a. Furthermore, the cutting chip 11C has a chip 63 formed in a tapered shape whose tip end angle is 30°, and the chip 63 includes two cutting edges 63a and 63b. In this case, the cutting chip 11C is a commercially available chip, and both chips 62 and 63 can be used. Accordingly, the chip support part 22 forms therein an attaching recess 64 in which the cutting chip 11C is fitted, and the attaching recess 64 includes right-and-left guide surfaces 64a and 64b that support the cutting edges 63a and 63b of the cutting chip 11C, respectively. Furthermore, the chip support part 22 has a cutout portion 65 formed in the intersection of the guide surfaces 64a and 64b. The cutting tool 10C is applicable to an annular groove whose width is large.

Furthermore, in the second modification, a cutting tool 10D has a cutting chip 11D and a chip holder 12D, and the center portion of the cutting chip 11D is fixed to the tip-end upper end portion of the chip support part 22 in the chip holder 12D with a fixing pin 71. The cutting chip 11D includes a chip 72 formed in a tapered shape whose tip end angle is 30°, and a support part 73. The chip support part 22 forms therein an attaching recess 74 in which the cutting chip 11D is fitted, and the attaching recess 74 includes right-and-left guide surfaces 74a and 74b that support the support part 73 of the cutting chip 11D. Furthermore, in the chip support part 22 that supports the support part 73 of the cutting chip 11D, the height of the guide surface 74a located on the tip end side of the chip support part 22 is set lower than the height of the guide surface 74b. Accordingly, the support rigidity of the cutting chip 11D provided by the chip support part 22 can be improved.

In this manner, the cutting tool according to the embodiment includes the cutting chip 11 (11A, 11B), and the chip holder 12 (12A, 12B). The chip holder 12 (12A, 12B) includes: the body part 21 having the height-H1 dimension larger than the width-W1 dimension, the body part 21 including the first attachment face 31 that intersects with the cutting feed direction A, and the second attachment face 32 that intersects with the first attachment face 31; the chip support part 22 whose base end portion is connected to the body part 21 and in which the cutting chip 11 (11A, 11B) is attached to the upper end portion in the height direction of the tip end portion of the chip support part 22 such that the cutting chip 11 projects to one side in the width direction; the reinforcement part 23 provided along the height direction of the chip support part 22; and the chip receiving part 24 that supports the cutting chip 11 (11A, 11B) projecting from the chip support part 22.

Consequently, in the chip holder 12 (12A, 12B) that holds the cutting chip 11 (11A, 11B), the body part 21 is attached to the machine tool via the first attachment face 31 and the second attachment face 32, thus attaching the body part 21 to the machine tool with high precision, and the height-H1 dimension of the body part 21 is larger than the width-W1 dimension of the body part 21, thus improving the rigidity of the body part 21 and suppressing the deformation of the body part 21 due to the stress that acts on the body part 21 in machining. Furthermore, in the chip holder 12 (12A, 12B), the chip support part 22 is reinforced by the reinforcement part 23, thus improving the torsional rigidity of the chip holder 12 (12A, 12B) and suppressing the deformation of the chip holder 12 (12A, 12B) due to the stress that acts on the chip holder 12 (12A, 12B) in machining. In addition, the cutting chip 11 (11A, 11B) is stably supported by the chip receiving part 24, thus suppressing the deformation of the cutting chip 11 (11A, 11B) due to the stress that acts on the cutting chip 11 (11A, 11B) in machining. As a result, the vibration of the cutting chip 11 (11A, 11B) when machining the annular groove G is suppressed, thus improving the machining accuracy of the annular groove G.

In the cutting tool according to the embodiment, the reinforcement part 23 is formed in a curved shape such that the cutting chip-11 (11A, 11B) side of the reinforcement part 23 is recessed. Consequently, the reinforcement part 23 is formed in a curved shape so that the reinforcement part 23 can be formed in a shape similar to the shape of the outer periphery of the rotor R to be machined, thus preventing the reinforcement part 23 and the rotor R from being interfered with each other. In addition, the sufficient thickness of the reinforcement part 23 is ensured to suppress the torsion of the chip support part 22 in machining, thus improving the machining accuracy of the rotor R.

In the cutting tool according to the embodiment, the cutout portion 34 is formed in the intersection of the second attachment face 32 and the third attachment face 33. Consequently, in the chip holder 12 (12A, 12B), two attachment faces (the second attachment face 32 and the third attachment face 33) are properly brought into contact with the attachment face of the machine tool, thus improving the mounting accuracy of the chip holder 12 (12A, 12B).

In the cutting tool according to the embodiment, the chip receiving part 24 is formed in a tapered shape tapering in the direction away from the cutting chip 11 (11A, 11B), and includes the flank 42 formed on the upstream in the cutting feed direction A of the cutting chip 11 (11A, 11B). Consequently, the chip receiving part 24 is formed in a tapered shape, thus receiving properly the stress of the cutting chip 11 (11A, 11B), and supporting stably the cutting chip 11 (11A, 11B). Furthermore, the flank 42 is formed in the cutting chip 11 (11A, 11B), thus discharging stably swarf produced in machining with the use of the cutting chip 11 (11A, 11B) without clogging the swarf around the cutting chip 11 (11A, 11B).

In the cutting tool according to the embodiment, the cutting chip 11 (11A, 11B) is fixed to the upper end portion of the chip support part 22 with the fixing pin 51, and right-and-left sides of the cutting chip 11 (11A, 11B) are respectively supported by the right-and-left guide surfaces 54a and 54b provided in the chip support part 22. Consequently, the three point support of the cutting chip 11 (11A, 11B) is achieved, thus supporting stably the cutting chip 11 (11A, 11B).

Furthermore, the method for machining the annular groove according to the embodiment includes: forming the first annular groove G1 being constant in width; forming the second annular groove G2 on one side in the rotation axis direction of the rotor R and on the rotation axis side of the rotor R, in the first annular groove G1; and forming the third annular groove G3 to be continuously extended to the second annular groove G2 on the one side in the rotation axis direction of the rotor R and on the outer periphery side of the rotor R, in the first annular groove G1.

Consequently, the second annular grooves G2 and the third annular grooves G3 are formed in the first annular groove G1 so as to form the annular groove G, and the vibration of the cutting chip 11 (11A, 11B) when machining the annular groove G is suppressed, thus improving the machining accuracy of the annular groove G.

In the method for machining the annular groove according to the embodiment, the second annular groove G2 and the third annular groove G3 are formed on one side in the rotation axis direction of the rotor R in the first annular groove G and thereafter, the second annular groove G2 and the third annular groove G3 are also formed on the other side in the rotation axis direction of the rotor, in the first annular groove G1. Consequently, it is possible to form easily the annular groove G having a T-shape in cross section with high precision in a short time.

REFERENCE SIGNS LIST 10, 10A, 10B, 10C, 10D cutting tool
11, 11A, 11B, 11C, 11D cutting chip
12, 12A, 12B, 12C, 12D chip holder
21 body part
22 chip support part
23 reinforcement part
24 chip receiving part
31, 32, 33, 35 attachment face
34 cutout portion
36 attachment face
37 attachment pressing face
38 fixture
41 stepped portion
42 flank
51, 56, 61, 71 fixing pin
52, 57, 62, 63, 72 tip
53, 58 support part
54, 59, 64, 74 attaching recess
54a, 54b, 59a, 59b, 64a, 64b, 74a, 74b guide surface
A cutting feed direction
G annular groove
G1 first annular groove
G2 second annular groove
G3 third annular groove
R rotor (rotary body)

The invention claimed is:

1. A cutting tool comprising:
a cutting chip; and
a chip holder configured to hold the cutting chip, wherein the chip holder includes
a body part having a height dimension larger than a width dimension, the body part including a first attachment face that intersects with a cutting feed direction, and a second attachment face that intersects with the first attachment face, the cutting feed direction is a length direction of the chip holder;
a chip support part whose base end portion is connected to the body part and in which the cutting chip is attached to an upper end portion in a height direction of a tip end portion of the chip support part such that the cutting chip projects to one side in a width direction of the chip support part that intersects with the length direction;
a reinforcement part provided along the height direction of the chip support part, the reinforcement part having a third attachment face arranged parallel to the first attachment face at a portion projecting from the body part;
a cutout portion formed in an intersection of the third attachment face and the second attachment face; and
a chip receiving part projecting to the one side in the width direction of the chip support part and configured to support the cutting chip projecting from the chip support part.

2. The cutting tool according to claim 1, wherein the reinforcement part is formed in a curved shape such that a cutting chip side of the reinforcement part is recessed.

3. The cutting tool according to claim 1, wherein the chip receiving part is formed in a tapered shape tapering downwardly in a height direction of the chip support part, and includes a flank formed on an upstream in the cutting feed direction of the cutting chip.

4. The cutting tool according to claim 1, wherein the cutting chip is fixed to the upper end portion of the chip support part with a fixing pin, and right-and-left sides of the cutting chip are respectively supported by right-and-left guide surfaces provided in the chip support part.

5. The cutting tool according to claim 1, wherein the cutting chip is formed in a tapered shape, and includes a cutting edge at a tip end corner portion of the tapered shape.

* * * * *